United States Patent
Hayashi et al.

(10) Patent No.: US 6,699,312 B2
(45) Date of Patent: Mar. 2, 2004

(54) EMULSION INK FOR STENCIL PRINTING

(75) Inventors: Yoshihiro Hayashi, Amimachi (JP); Yoshifumi Watanabe, Amimachi (JP)

(73) Assignee: Riso Kagaku Corporation, Tokyo (JP)

( * ) Notice: Subject to any disclaimer, the term of this patent is extended or adjusted under 35 U.S.C. 154(b) by 106 days.

(21) Appl. No.: 10/046,140

(22) Filed: Jan. 16, 2002

(65) Prior Publication Data

US 2002/0129735 A1 Sep. 19, 2002

(30) Foreign Application Priority Data

Jan. 17, 2001 (JP) .................................... 2001-008908

(51) Int. Cl.7 ............................................... C09D 11/00
(52) U.S. Cl. .................................................. 106/31.26
(58) Field of Search ...................................... 106/31.26

(56) References Cited

U.S. PATENT DOCUMENTS

| | | | | |
|---|---|---|---|---|
| 5,573,578 A | * | 11/1996 | Okuda | 106/31.26 |
| 5,853,466 A | * | 12/1998 | Matsuura et al. | 106/31.26 |
| 5,880,214 A | * | 3/1999 | Okuda | 524/801 |
| 5,902,388 A | * | 5/1999 | Matsuura et al. | 106/31.25 |
| 6,011,083 A | | 1/2000 | Okuda et al. | |
| 6,117,221 A | | 9/2000 | Nagashima et al. | |
| 6,156,109 A | * | 12/2000 | Asada | 106/31.26 |
| 6,165,258 A | * | 12/2000 | Asada | 106/31.26 |
| 6,190,444 B1 | * | 2/2001 | Okuda et al. | 106/31.26 |
| 2002/0033115 A1 | * | 3/2002 | Hayashi et al. | 106/31.26 |
| 2002/0043176 A1 | * | 4/2002 | Hayashi et al. | 106/31.26 |
| 2002/0124770 A1 | * | 9/2002 | Hayashi | 106/31.26 |
| 2002/0148385 A1 | * | 10/2002 | Ogawa et al. | 106/31.25 |

FOREIGN PATENT DOCUMENTS

| | | |
|---|---|---|
| JP | 06-145577 A | 5/1994 |
| JP | 06-192606 A | 7/1994 |
| JP | 07-150091 A | 6/1995 |

* cited by examiner

Primary Examiner—Helene Klemanski
(74) Attorney, Agent, or Firm—Nixon Peabody LLP; Donald R. Studebaker

(57) ABSTRACT

A W/O emulsion ink for stencil printing contains, in its water phase, a material which reacts with oxygen dissolved in the water phase and reduces the amount of oxygen dissolved in the water phase.

20 Claims, No Drawings

EMULSION INK FOR STENCIL PRINTING

BACKGROUND OF THE INVENTION

1. Field of the Invention

This invention relates to W/O emulsion ink for stencil printing, and more particularly to stencil printing W/O emulsion ink which is excellent in storage stability.

2. Description of the Related Art

The stencil printing is advantageous over other printing systems such as offset printing, gravure printing, letterpress printing and the like in that it permits to easily make prints without a skilled operator and complicated cleaning after printing is not necessary.

From the advent of the thermal stencil making system using a thermal head, image processing in the stencil printing has come to be digitized, whereby it has become feasible to easily obtain high quality printings in a short time, which makes it feasible to use the stencil printer as an information processing terminal.

Further, in the thermal stencil making system using a thermal head, perforations can be more regular in size and accordingly the amount of ink transferred to the printing paper can be more accurately controlled than in the conventional stencil making system in which infrared rays or xenon flash is employed to perforate the stencil material. Thus by using the thermal stencil making system, probability of generation of offset and/or spread of ink is reduced and the quality of printings is greatly improved.

As the stencil printing ink, W/O emulsion ink has been generally used. However, the W/O emulsion ink is disadvantageous in that coalescence of water phase particles is promoted when the ink is stored long due to its higher water phase (the inner phase of the emulsion) content relatively to the oil phase content and the water phase is separated from the oil phase. That is, the W/O emulsion ink is generally poor in storage stability.

Thus, there have been proposed various methods of improving the storage stability of the W/O emulsion ink. For example, in Japanese Unexamined Patent Publication No. 6(1994)-145577, there is disclosed that the stability of emulsion can be enhanced by the use of polyglyceryn fatty acid ester not higher than 10 in HLB. Further, in Japanese Unexamined Patent Publication No. 10(1998)-1634, there is disclosed that the stability of emulsion can be enhanced by adding acid-anhydride-containing water-soluble polymer to the water phase. Further, in Japanese Unexamined Patent Publication No. 2000-7972, there is disclosed that the stability of emulsion can be enhanced by adding to the oil phase alkyd resin or rosin-modified resin after reacting it with aluminum chelate or aluminum alcoholate.

Further, in Japanese Unexamined Patent Publication No. 6(1994)-192606, there is disclosed that the stability of emulsion can be enhanced by adding electrolyte to the water phase of the emulsion since the surface active agent density in the emulsion is increased, the particle size in the emulsion is reduced and the particle size distribution is narrowed. Further, in Japanese Unexamined Patent Publication No. 7(1995)-150091, there is disclosed that the stability of emulsion can be enhanced by adding water-soluble magnesium salt (electrolyte) to the water phase of the emulsion.

As can be understood from the description above, enhancing the stability of emulsion is very important in improving the storage stability of the emulsion ink. However, conventional emulsion inks for stencil printing are not satisfactory in all the points of view and there has been a demand for further improvement.

SUMMARY OF THE INVENTION

In view of the foregoing observations and description, the primary object of the present invention is to provide a W/O emulsion ink for stencil printing in which separation of phases is suppressed and which is very excellent in storage stability.

In accordance with a first aspect of the present invention, there is provided W/O emulsion ink for stencil printing characterized in that a material which reacts with oxygen dissolved in the water phase thereof and reduces the amount of oxygen dissolved in the water phase is contained in the water phase.

The material which reacts with oxygen dissolved in the water phase thereof and reduces the amount of oxygen dissolved in the water phase (will be referred to as "oxygen reducing material", hereinbelow.) may be, for instance, an inorganic material, an organic material or a free ion.

In accordance with a second aspect of the present invention, there is provided W/o emulsion ink for stencil printing characterized in that a water-soluble and electrolytic anti-oxidant is contained in the water phase.

The "water-soluble anti-oxidant" is a water-soluble compound which prevents the W/O emulsion ink from being physically and/or chemically deteriorated by oxidization.

In accordance with a third aspect of the present invention, there is provided W/O emulsion ink for stencil printing characterized in that sulfite ions are contained in the water phase.

It is preferred that the sulfite ions be generated from sulfite and/or hydrogen sulfite contained in the water phase.

It is preferred that the sulfite or the hydrogen sulfite is an alkaline metal salt or an alkaline earth metal salt. As the alkaline metal salt, potassium salt or sodium salt is especially preferred.

It is preferred that the total amount of the sulfite and/or hydrogen sulfite is 0.01 to 5% by weight of the water phase.

In accordance with a fourth aspect of the present invention, there is provided W/O emulsion ink for stencil printing characterized in that thiosulfate is contained in the water phase.

It is preferred that the thiosulfate is an alkaline metal salt or an alkaline earth metal salt. As the alkaline metal salt, potassium salt or sodium salt is especially preferred. As the alkaline earth metal salt, magnesium salt or calcium salt is especially preferred.

It is preferred that the total amount of the thiosulfate is 0.01 to 5% by weight of the water phase.

In accordance with a fifth aspect of the present invention, there is provided W/O emulsion ink for stencil printing characterized in that at least one material selected from the group consisting of dithionous acid, pyrosulfurous acid, dithionite and pyrosulfite is contained in the water phase.

It is preferred that the dithionite or the pyrosulfite is an alkaline metal salt or an alkaline earth metal salt. As the alkaline metal salt, potassium salt or sodium salt is especially preferred.

It is preferred that the total amount of the dithionite and/or pyrosulfite is 0.01 to 5% by weight of the water phase.

It is further preferred that the total amount of electrolyte contained in the water phase be 0.1 to 5% by weight of the water phase. Sulfite, hydrogen sulfite, thiosulfate, dithionous acid, pyrosulfurous acid, dithionite and pyrosulfite are all electrolyte and "the total amount of electrolyte contained in the water phase" means the total amount of sulfite, hydrogen sulfite, thiosulfate, dithionous acid, pyrosulfurous acid, dithionite and/or pyrosulfite including other electrolyte contained in the water phase, if any.

It is preferred that the content of the oil phase be 15 to 50% by weight and the content of the water phase be 50 to 85% by weight.

Resins contained in W/O emulsion ink for stencil printing are generally added to the ink for the purpose of increasing the viscosity of the oil phase and/or enhancing the interfacial force between the oil phase and the water phase in order to improve the storage stability and printing performance of the ink. Since the resin is apt to be oriented on the interface between the oil phase and the water phase, it may be considered that oxidization of the resin by oxygen dissolved in the ink weakens the interfacial force between the oil phase and water phase, whereby the oil phase and the water phase become apt to be separated from each other.

Further when the resin and/or the oil components are oxidized, the polarity of the oil phase changes, which results in change of the required HLB of the emulsion, the compatibility of the oil phase components changes so that components which becomes unable to be dissolved in the oil phase separate out on the surface of the ink and the emulsion becomes unstable, whereby the oil phase and the water phase become apt to be separated from each other.

It is considered that the "oxygen reducing material" contained in the water phase of the W/O emulsion ink for stencil printing in accordance with the first aspect of the present invention prevents oxidization of the resin oriented on the interface between the oil phase and the water phase and/or keeps usual the compatibility of the oil phase components, thereby improving the storage stability of the ink.

It is considered that the "water-soluble and electrolytic anti-oxidant" contained in the water phase of the W/O emulsion ink for stencil printing in accordance with the second aspect of the present invention increases the density of the emulsifier at the interface between the oil phase and the water phase, thereby improving the storage stability of the ink.

It is considered that sulfite ions, thiosulfate, dithionous acid, pyrosulfurous acid, dithionite or pyrosulfite contained in the water phase of the W/O emulsion inks for stencil printing in accordance with the third to fifth aspects of the present invention generates sulfite ions, thiosulfate ions, dithionite ions or pyrosulfite ions in the water phase and these ions react with oxygen dissolved in the water phase to reduce the amount of oxygen dissolved in the water phase, whereby oxidization of the resin oriented on the interface between the oil phase and the water phase is suppressed and the storage stability of the ink is improved.

Further, it is considered that sulfite ions, thiosulfate ions, dithionite ions or pyrosulfite ions contained in the water phase increases the density of the emulsifier at the interface between the oil phase and the water phase, thereby improving the storage stability of the ink. It is further considered that sulfate ions generated by oxidization of sulfite ions, thiosulfate ions, dithionite ions or pyrosulfite ions can also increases the density of the emulsifier at the interface between the oil phase and the water phase and oxidization of these ions does not deteriorate the storage stability of the ink.

At the surface of ink where ink is in contact with air, water content of the ink evaporates. Since sulfite ions, thiosulfate ions, dithionite ions or pyrosulfite ions do not evaporate, it is considered that these ions exist in high concentration at the surface of the ink, which effectively prevents oxygen in the air from dissolving in the ink and prevents the resin and the oil components in the ink from being oxidized, whereby the storage stability of the ink is further improved.

Further, when an alkaline metal salt or an alkaline earth metal salt is employed as the sulfite, the hydrogen sulfite, the thiosulfate, the dithionite or the pyrosulfite, the density of the emulsifier at the interface between the oil phase and the water phase is further increased and the storage stability of the ink is further improved.

When the total amount of the sulfite, the hydrogen sulfite, the thiosulfate, the dithionite and/or the pyrosulfite is 0.01 to 5% by weight of the water phase, the storage stability of the ink is further improved.

Further since electrolyte effectively increases the density of the emulsifier at the interface between the oil phase and the water phase, the total amount of sulfite, hydrogen sulfite, thiosulfate, dithionous acid, pyrosulfurous acid, dithionite and/or pyrosulfite including other electrolyte contained in the water phase, if any, may be 0.1 to 5% by weight of the water phase.

DETAILED DESCRIPTION OF THE INVENTION

The present invention will be described in more detail, hereinbelow. Though the oil phase of stencil printing W/O emulsion ink basically comprises a coloring agent, emulsifier, oil components and the like, stencil printing W/O emulsion ink further containing resin in its oil phase will be described here. When the water phase contains a coloring agent, the oil phase need not contain a coloring agent.

As the coloring agent, pigments and/or dyes may be employed. As the pigments, organic pigments such as azo-pigments, phthalocyanine pigments, dye pigments, condensation polycyclic pigments, nitro-pigments, nitroso pigments, and the like (e.g., brilliant carmine 6B, lake red C, Watchung red, disazo yellow, Hansa yellow, phthalocyanine blue, phthalocyanine green, alkali blue, aniline black), inorganic pigments such as metals (e.g., cobalt, iron, chrome, copper, zinc, lead, titanium, vanadium, manganese, nickel), metal oxides, metal sulfides, carbon blacks (e.g., furnace black, lamp black, acetylene black and channel black), yellow ocher, ultramarine, iron blue pigments and the like can be employed. As the dyes, oil-soluble dyes such as azo series dyes, anthraquinone series dyes and azine series dyes can be employed. Though may be either of pigment and dye, pigment is advantageous over dye in that spread of ink and strike-through can be suppressed and ink excellent in weathering resistance can be obtained. Preferably the coloring agent content is not larger 20% by weight of the total weight of the ink, and more preferably the coloring agent content is 3 to 10% by weight of the total weight of the ink.

The emulsifier is for forming W/O emulsion and may be any of anion surface active agents, cation surface active agents, amphoteric surface active agents and nonionic surface active agents. From the viewpoints of emulsification of the W/O emulsion and the storage stability, nonionic surface active agent is preferred. For example, fatty acid esters of sorbitan such as sorbitan monolaurate, sorbitan monopalmitate, sorbitan monooleate, sorbitan sesquioleate, sorbitan monoisostearate, and the like; glycerides such as glyceryl monostearate, hexaglyceryl tetraoleate, decaglyceryl decaoleate, hexaglyceryl pentaoleate and the like; fatty acid esters of polyoxyethylene sorbitan; fatty acid esters of polyoxyethylene glycerin; fatty acid esters of polyoxyethylene sorbitol; fatty acid esters of propylene glycol; fatty acid esters of (poly)ethylene glycol; polyoxyethylene alkylether; polyoxyethylenepolyoxypropylene alkylether; polyoxyethylene alkylphenylether; and polyoxyethylene hydrogenated castor oil may be suitably used. One emulsifier may be used alone or two or more kinds of emulsifiers may be used in combination. The content of the emulsifier is preferably 0.1 to 10% by weight of the total weight of the ink, and more preferably 1 to 5% by weight of the total weight of the ink.

As the oil components, various industrial solvents; mineral oils such as motor oil, gear oil, gas oil, kerosene, spindle oil, machine oil, liquid paraffin and the like; vegetable oils such as olive oil, colza oil, castor oil, linseed oil, salad oil, soybean oil and the like; as well as synthetic oils can be suitably employed. It is preferred that a mixture of a plurality of oils different in volatility is employed in order to improve, for instance, printing performance after the printer is kept unoperated for a long time.

The resin is employed to provide a viscosity to the ink and to increase stability of the emulsion and oil-soluble resins are employed. When the oil phase contains therein pigment and/or extending pigment, the resin improve the dispersion of the pigments and enhances fixing to the printing paper of the pigments. For example, rosin, gilsonite, rosin ester, maleic acid resin, phenol resin, alkyd resin, petroleum resin, acrylic resin, amino resin, urethane resin, cellulose resin, natural rubber derivative resin and the like may be suitably used. Among those, phenol resin and alkyd resin are especially preferred. Further, reaction products of alkyd resin or rosin-modified resin with aluminum chelate compounds or aluminum alcoholate compounds may be suitably used. The content of resin is preferably 1 to 20% by weight of the total weight of the ink, and more preferably 3 to 15% by weight of the total weight of the ink.

If desired, the oil phase may further contain extending pigment, gelling agent and pigment dispersant as well as anti-oxidizing agent.

The main component of the water phase is water, and the water phase contains sulfite ions, thiosulfate, dithionous acid, pyrosulfurous acid, dithionite or pyrosulfite.

Sulfite ions can be contained in the water phase by adding, for instance, sulfurous acid to the water phase. However, it is preferred that sulfite ions be provided in the form of salt (e.g., sulfite and/or hydrogen sulfite) since not only the sulfite ions but also cations forming the salt increases the density of the emulsifier at the interface between the oil phase and the water phase.

As the sulfite, zinc sulfite, ammonium sulfite, potassium sulfite, sodium sulfite, magnesium sulfite and the like can be employed. As the hydrogen sulfite, ammonium hydrogensulfite, potassium hydrogensulfite, sodium hydrogensulfite and the like can be employed. It is preferred that the sulfite or the hydrogen sulfite be an alkaline metal salt or an alkaline earth metal salt because of their easiness to handle and their effect of increasing the density of the emulsifier at the interface between the oil phase and the water phase. Among those, potassium sulfite and sodium sulfite are especially preferred because of their easiness to dissolve in water.

As the thiosulfate, ammonium thiosulfate, potassium thiosulfate, calcium thiosulfate, strontium thiosulfate, iron thiosulfate, sodium thiosulfate, barium thiosulfate, magnesium thiosulfate and the like can be employed. It is preferred that the thiosulfate be an alkaline metal salt or an alkaline earth metal salt because of their easiness to handle and their effect of increasing the density of the emulsifier at the interface between the oil phase and the water phase. Among those, potassium thiosulfate, sodium thiosulfate, calcium thiosulfate and magnesium thiosulfate are especially preferred because of their easiness to dissolve in water.

As the dithionous acid, pyrosulfurous acid and their salts, aqueous dithionous acid, ammonium dithionite, potassium dithionite, sodium dithionite, magnesium dithionite, zinc dithionite, ammonium pyrosulfite, potassium pyrosulfite, sodium pyrosulfite, ruthenium pyrosulfite and the like can be employed. These compounds may be employed alone or two or more of these compounds maybe employed in combination. An alkaline metal salt or an alkaline earth metal salt is preferred because of their inexpensiveness and easiness to handle and their effect of increasing the density of the emulsifier at the interface between the oil phase and the water phase. Among those, potassium salt and sodium salt are especially preferred because of their inexpensiveness and easiness to dissolve in water.

The respective contents of the sulfite and/or hydrogen sulfite, the thiosulfate, and the dithionite and/or pyrosulfite are preferably 0.01 to 5% by weight of the water phase and more preferably 0.1 to 2% by weight of the water phase. When the contents are less than 0.01% by weight, the anti-oxidization effect is unsatisfactory and the anti-oxidization effect is saturated at 5% by weight of the water phase. Some of sulfites, hydrogensulfites and thiosulfates are difficult to dissolve in water. In this case, the maximum solubility in water defines the upper limit of the content. Some of sulfites, hydrogensulfites and thiosulfates are known solely in the form of an aqueous solution. In this case, the content of the compounds is derived from the concentration of the compounds in the solution. When a salt having water of crystallization, the content of the compound is in terms of anhydrous salt.

Though the aforesaid sulfite, hydrogen sulfite, thiosulfate, dithionous acid, pyrosulfurous acid, dithionite and pyrosulfite are all electrolyte, electrolyte other than these electrolytes may be contained in the water phase. For example, sodium sulfate, magnesium sulfate, potassium hydrogenphosphate, sodium citrate, potassium tartrate, sodium borate and the like are preferred. The total amount of electrolyte contained in the water phase is preferably 0.1 to 5% by weight of the water phase and more preferably 0.5 to 2% by weight of the water phase. When the content is less than 0.1% by weight, the effect of increasing the density of the emulsifier at the interface between the oil phase and the water phase is unsatisfactory and the effect is saturated at 5% by weight of the water phase.

Though the water phase may contain each of sulfite ions, thiosulfate, dithionous acid, pyrosulfurous acid, dithionite and pyrosulfite alone, or two or more of these compounds in combination.

It is preferred that the water phase contains evaporation retardant and antifreezing agent. For example, water-soluble organic solvents, e.g., polyhydric alcohols such as ethylene glycol, propylene glycol, diethylene glycol, polyethylene glycol and glycerin, may be employed. The content of such components is preferably 1 to 20% by weight of the total weight of the water phase, and more preferably 3 to 15% by weight of the total weight of the water phase.

When the oil phase contains no coloring agent, the water phase may contain a coloring agent. As the coloring agent, pigment and/or dye may be used. As the pigment, those described above in conjunction with the pigments which may be contained in the oil phase maybe employed. As the dye, among basic dyes, acid dyes, direct dyes, soluble vat dyes, acid mordant dyes, mordant dyes, reactive dyes, vat dyes and sulfur dyes, water-soluble dyes including those which become water-soluble by reduction or the like may be preferably employed. Further, disperse dyes such as of azo series, anthraquinone series, azomethine series and nitro series may also be preferably employed.

If necessary, the water phase may include O/W resin emulsion and/or water-soluble resin. When pigments and/or extending pigment are added to the water phase, the O/W resin emulsion and/or water soluble resin improve wettability and dispersion of the pigments and enhances fixing to the printing paper of the pigments.

As the O/W resin emulsion, emulsions of polyvinyl acetate, ethylene-vinyl acetate copolymer, vinyl acetate-acrylic ester copolymer, polymethacrylic ester, polystyrene, styrene-acrylic ester copolymer, styrene-butadiene copolymer, vinylidene chloride-acrylic ester copolymer, polyvinyl chloride, vinyl chloride-vinyl acetate copolymer and polyurethane are suitable.

As the water-soluble resin, polyvinyl alcohol, methyl cellulose, carboxymethyl cellulose, hydroxyethyl cellulose, polyvinylpyrrolidone, polyethylene-polyvinyl alcohol copolymer, polyethylene oxide, polyvinyl ether, polyacrylamide, gum Arabic, starch, water-soluble urethane and the like are suitable.

In order to improve wettability and dispersion to water of the pigments and/or extending pigments, anion surface active agents, cation surface active agents, amphoteric surface active agents, nonionic surface active agents, high-polymer surface active agents, silicone surface active agents, fluorine surface active agents, tertiary amine compounds such as polyvinyl pyrrolidone, polyethylene-imine, alkylolamine salt, and poly-N-acryloylpyrrolidine, acid anhydride-containing olefin copolymers and acid anhydride-containing water-soluble polymers such as acid anhydride-containing vinyl copolymers may be added to the water phase. Among these dispersants, the tertiary amine compounds and the acid anhydride-containing water-soluble polymers are especially preferred.

If necessary, the water phase may further contain a pH adjustor. Especially, when the water phase contains dithionous acid, pyrosulfurous acid and/or their salts, it is preferred that the water phase be neutral to alkaline since the anti-oxidization effect is apt to be weakened when the water phase is acidic. The water phase is preferably not lower than 6.5 in pH and more preferably not lower than 7.0 in pH.

Extending pigments, preservatives and the like may be added to the water phase as desired.

The W/O emulsion ink of the present invention is generally produced by gradually adding 50 to 85% by weight of water phase to 15 to 50% by weight of oil phase and emulsifying the mixture by the use of a known emulsifier. The present invention will be described in further detail with reference to embodiments, hereinbelow.

Embodiment A1

5% by weight of phthalocyanine green, 10% by weight of alkyd resin, 6% by weight of naphthene series petroleum solvent, 1% by weight of polyglyceryn fatty acid ester and 1% by weight of polyoxyethylene castor oil were mixed and dispersed well with a triple roll mill. The resultant pigment dispersion was mixed with 5% by weight of motor oil and 5% by weight of paraffin series petroleum solvent to prepare an oil phase, and the oil phase thus prepared was introduced into an emulsifier. A mixed solution (a water phase) of 60% by weight of ion-exchanged water, 6% by weight of glycerin and 1% by weight of potassium sulfite were dropped in the oil phase little by little with the agitating element rotated. In this manner, emulsification were continued until a desired viscosity is obtained, whereby emulsion ink for stencil printing was obtained.

Embodiment A2

Emulsion ink for stencil printing of embodiment A2 was obtained in the same manner as the embodiment A1 except that the composition was as shown in the following table 1.

Embodiment A3

Emulsion ink for stencil printing of embodiment A3 was obtained in the same manner as the embodiment A1 except that the composition was as shown in the following table 1.

Comparative Example A1

Emulsion ink for stencil printing of comparative example A1 was obtained in the same manner as the embodiment A1 except that sodium sulfate was employed in place of potassium sulfite.

Comparative Example A2

Emulsion ink for stencil printing of comparative example A2 was obtained in the same manner as the embodiment A1 except that magnesium sulfate was employed in place of potassium sulfite.

TABLE 1

|  | embodiment A1 | embodiment A2 | embodiment A3 | compara. example A1 | compara. example A2 |
|---|---|---|---|---|---|
| oil phase |  |  |  |  |  |
| phthalocyanine green | 5.0 | 5.0 | 5.0 | 5.0 | 5.0 |
| alkyd resin | 10.0 | 10.0 | 10.0 | 10.0 | 10.0 |
| motor oil | 5.0 | 5.0 | 5.0 | 5.0 | 5.0 |
| naphthene series petroleum solvent | 6.0 | 6.0 | 6.0 | 6.0 | 6.0 |
| paraffin series petroleum solvent | 5.0 | 5.0 | 5.0 | 5.0 | 5.0 |
| polyglyceryn fatty acid ester | 1.0 | 1.0 | 1.0 | 1.0 | 1.0 |
| polyoxyethylene castor oil | 1.0 | 1.0 | 1.0 | 1.0 | 1.0 |
| water phase |  |  |  |  |  |
| ion-exchanged water | 60.0 | 60.0 | 60.0 | 60.0 | 60.0 |
| glycerin | 6.0 | 6.0 | 6.0 | 6.0 | 6.0 |
| potassium sulfite | 1.0 |  |  |  |  |
| sodium sulfite |  | 1.0 | 0.03 |  |  |

TABLE 1-continued

|  | embodiment A1 | embodiment A2 | embodiment A3 | compara. example A1 | compara. example A2 |
| --- | --- | --- | --- | --- | --- |
| sodium sulfate |  |  |  | 1.0 |  |
| magnesium sulfate |  |  | 0.97 |  | 1.0 |

The stencil printing emulsion inks of the embodiments A1 to A3 and the comparative examples A1 and A2 were contained in respective containers and stored for twenty days at 70° C. Appearances of each ink was visually evaluated. The inks in accordance with the embodiments A1 to A3 of the present invention which contained sulfite ions in the water phase were in a good state whereas in the ink of the comparative examples A1 and A2 which contained no sulfite ions in the water phase, a part of the ink was separated into the oil phase and the water phase.

Embodiment B1

5% by weight of phthalocyanine green, 10% by weight of alkyd resin, 6% by weight of naphthene series petroleum solvent, 1% by weight of polyglyceryn fatty acid ester and 1% by weight of polyoxyethylene castor oil were mixed and dispersed well with a triple roll mill. The resultant pigment dispersion was mixed with 5% by weight of motor oil and 5% by weight of paraffin series petroleum solvent to prepare an oil phase, and the oil phase thus prepared was introduced into an emulsifier. A mixed solution (a water phase) of 60% by weight of ion-exchanged water, 6% by weight of glycerin and 1% by weight of sodium thiosulfate were dropped in the oil phase little by little with the agitating element rotated. In this manner, emulsification were continued until a desired viscosity is obtained, whereby emulsion ink for stencil printing was obtained.

Embodiment B2

Emulsion ink for stencil printing of embodiment B2 was obtained in the same manner as the embodiment B1 except that the composition was as shown in the following table 2.

Embodiment B3

Emulsion ink for stencil printing of embodiment B3 was obtained in the same manner as the embodiment B1 except that the composition was as shown in the following table 2.

Comparative Example B1

Emulsion ink for stencil printing of comparative example B1 was obtained in the same manner as the embodiment B1 except that sodium sulfate was employed in place of sodium thiosulfate.

Comparative Example B2

Emulsion ink for stencil printing of comparative example B2 was obtained in the same manner as the embodiment B1 except that magnesium sulfate was employed in place of sodium thiosulfate.

TABLE 1

|  | embodiment B1 | embodiment B2 | embodiment B3 | compara. example B1 | compara. example B2 |
| --- | --- | --- | --- | --- | --- |
| oil phase |  |  |  |  |  |
| phthalocyanine green | 5.0 | 5.0 | 5.0 | 5.0 | 5.0 |
| alkyd resin | 10.0 | 10.0 | 10.0 | 10.0 | 10.0 |
| motor oil | 5.0 | 5.0 | 5.0 | 5.0 | 5.0 |
| naphthene series petroleum solvent | 6.0 | 6.0 | 6.0 | 6.0 | 6.0 |
| paraffin series petroleum solvent | 5.0 | 5.0 | 5.0 | 5.0 | 5.0 |
| polyglyceryn fatty acid ester | 1.0 | 1.0 | 1.0 | 1.0 | 1.0 |
| polyoxyethylene castor oil | 1.0 | 1.0 | 1.0 | 1.0 | 1.0 |
| water phase |  |  |  |  |  |
| ion-exchanged water | 60.0 | 60.0 | 60.0 | 60.0 | 60.0 |
| glycerin | 6.0 | 6.0 | 6.0 | 6.0 | 6.0 |
| sodium thiosulfate | 1.0 |  |  |  |  |
| magnesium thiosulfate |  | 1.0 | 0.03 |  |  |
| sodium sulfate |  |  |  | 1.0 |  |
| magnesium sulfate |  |  | 0.97 |  | 1.0 |

The stencil printing emulsion inks of the embodiments B1 to B3 and the comparative examples B1 and B2 were contained in respective containers and stored for twenty days at 70° C. Appearances of each ink was visually evaluated. The inks in accordance with the embodiments B1 to B3 of the present invention which contained sodium thiosulfate in the water phase were in a good state whereas in the ink of the comparative examples B1 and B2 which contained no sodium thiosulfate in the water phase, a part of the ink was separated into the oil phase and the water phase.

Embodiment C1

5% by weight of phthalocyanine green, 10% by weight of alkyd resin, 6% by weight of naphthene series petroleum solvent, 1% by weight of polyglyceryn fatty acid ester and 1% by weight of polyoxyethylene castor oil were mixed and dispersed well with a triple roll mill. The resultant pigment dispersion was mixed with 5% by weight of motor oil and 5% by weight of paraffin series petroleum solvent to prepare an oil phase, and the oil phase thus prepared was introduced into an emulsifier. A mixed solution (a water phase) of 60.77% by weight of ion-exchanged water, 5.7% by weight of glycerin, 0.03% by weight of sodium dithionite, 0.2% by weight of sodium borate and 0.3% by weight of magnesium sulfate were dropped in the oil phase little by little with the agitating element rotated. In this manner, emulsification were continued until a desired viscosity is obtained, whereby emulsion ink for stencil printing was obtained.

Embodiment C2

Emulsion ink for stencil printing of embodiment C2 was obtained in the same manner as the embodiment C1 except that the composition was as shown in the following table 3.

Embodiment C3

Emulsion ink for stencil printing of embodiment C3 was obtained in the same manner as the embodiment C1 except that sodium pyrosulfite was employed in place of sodium dithionite and the composition was as shown in the following table 3.

Embodiment C4

Emulsion ink for stencil printing of embodiment C4 was obtained in the same manner as the embodiment C3 except that the composition was as shown in the following table 3.

Comparative Example C1

Emulsion ink for stencil printing of comparative example C1 was obtained in the same manner as the embodiment C1 except that sodium dithionite was not employed.

TABLE 3

|  | embodiment C1 | embodiment C2 | embodiment C3 | embodiment C4 | compara. example C1 |
|---|---|---|---|---|---|
| oil phase |  |  |  |  |  |
| phthalocyanine green | 5.0 | 5.0 | 5.0 | 5.0 | 5.0 |
| alkyd resin | 10.0 | 10.0 | 10.0 | 10.0 | 10.0 |
| motor oil | 5.0 | 5.0 | 5.0 | 5.0 | 5.0 |
| naphthene series petroleum solvent | 6.0 | 6.0 | 6.0 | 6.0 | 6.0 |
| paraffin series petroleum solvent | 5.0 | 5.0 | 5.0 | 5.0 | 5.0 |
| polyglyceryn fatty acid ester | 1.0 | 1.0 | 1.0 | 1.0 | 1.0 |
| polyoxyethylene castor oil | 1.0 | 1.0 | 1.0 | 1.0 | 1.0 |
| water phase |  |  |  |  |  |
| ion-exchanged water | 60.77 | 60.1 | 60.77 | 60.7 | 60.8 |
| glycerin | 5.7 | 5.7 | 5.7 | 5.7 | 5.7 |
| sodium dithionite | 0.03 | 1.0 |  |  |  |
| sodium pyrosulfite |  |  | 0.03 | 0.1 |  |
| sodium borate | 0.2 |  | 0.2 | 0.2 | 0.2 |
| sodium hydroxide |  | 0.2 |  |  |  |
| magnesium sulfate | 0.3 |  | 0.3 | 0.3 | 0.3 |

The stencil printing emulsion inks of the embodiments C1 to C4 and the comparative example C1 were contained in respective containers and stored for twenty days at 70° C. Appearances of each ink was visually evaluated. The inks in accordance with the embodiments C1 and C2 of the present invention which contained dithionite in the water phase and the inks in accordance with the embodiments C3 and C4 of the present invention which contained pyrosulfite in the water phase were in a good state whereas in the ink of the comparative example C1 which contained neither dithionite nor pyrosulfite in the water phase, a part of the ink was separated into the oil phase and the water phase.

As can be understood from the example above, "oxygen reducing material" or the "water-soluble and electrolytic anti-oxidant", e.g., sulfite ions, thiosulfate, dithionous acid, pyrosulfurous acid, dithionite or pyrosulfite, contained in the water phase of the W/O emulsion ink for stencil printing prevents oxidization of the resin oriented on the interface between the oil phase and the water phase, keeps usual the compatibility of the oil phase components, and/or increases the density of the emulsifier at the interface between the oil phase and the water phase, thereby improving the storage stability of the ink.

What is claimed is:

1. A W/O emulsion ink for stencil printing characterized in that sulfite ions are contained in the water phase.

2. A W/O emulsion ink for stencil printing as defined in claim 1 in which the total amount of electrolyte contained in the water phase is 0.1 to 5% by weight of the water phase.

3. A W/O emulsion ink for stencil printing as defined in claim 1 in which the content of the oil phase is 15 to 50% by weight and the content of the water phase is 50 to 85% by weight.

4. A W/O emulsion ink for stencil printing as defined in claim 1 in which the sulfite ions are generated from sulfite and/or hydrogen sulfite contained in the water phase.

5. A W/O emulsion ink for stencil printing as defined in claim 4 in which the sulfite or the hydrogen sulfite is an alkaline metal salt or an alkaline earth metal salt.

6. A W/O emulsion ink for stencil printing as defined in claim 5 in which the alkaline metal salt is potassium salt or sodium salt.

7. A W/O emulsion ink for stencil printing as defined in claim 4 in which the total amount of the sulfite and/or hydrogen sulfite is 0.01 to 5% by weight of the water phase.

8. A W/O emulsion ink for stencil printing characterized in that thiosulfate is contained in the water phase.

9. A W/O emulsion ink for stencil printing as defined in claim 8 in which the total amount of electrolyte contained in the water phase is 0.1 to 5% by weight of the water phase.

10. A W/O emulsion ink for stencil printing as defined in claim 8 in which the content of the oil phase is 15 to 50% by weight and the content of the water phase is 50 to 85% by weight.

11. A W/O emulsion ink for stencil printing as defined in claim 8 in which the thiosulfate is an alkaline metal salt or an alkaline earth metal salt.

12. A W/O emulsion ink for stencil printing as defined in claim 11 in which the alkaline metal salt is potassium salt or sodium salt.

13. A W/O emulsion ink for stencil printing as defined in claim 11 in which the alkaline earth metal salt is magnesium salt or calcium salt.

14. A W/O emulsion ink for stencil printing as defined in claim 8 in which the thiosulfate content is 0.01 to 5% by weight of the water phase.

15. A W/O emulsion ink for stencil printing characterized in that at least one material selected from the group consisting of dithionic acid, pyrosulfurous acid, dithionite and pyrosulfite is contained in the water phase.

16. A W/O emulsion ink for stencil printing as define in claim 15 in which the total amount of electrolyte contained in the water phase is 0.1 to 5% by weight of the water phase.

17. A W/O emulsion ink for stencil printing as defined in claim 15 in which the content of the oil phase is 15 to 50% by weight and the content of the water phase is 50 to 85% by weight.

18. A W/O emulsion ink for stencil printing as defined in claim 15 in which the dithionite or the pyrosulfite is an alkaline metal salt or an alkaline earth metal salt.

19. A W/O emulsion ink for stencil printing as defined in claim 18 in which the alkaline metal salt is potassium salt or sodium salt.

20. A W/O emulsion ink for stencil printing as defined in claim 15 in which the total amount of the dithionite and/or pyrosulfite is 0.01 to 5% by weight of the water phase.

* * * * *